(12) United States Patent
Schrödinger

(10) Patent No.: US 7,172,347 B1
(45) Date of Patent: Feb. 6, 2007

(54) OPTOELECTRONIC ARRANGEMENT WITH A PLUGGABLE OPTOELECTRONIC MODULE AND AN ELECTRICAL CONNECTOR TO BE MOUNTED ON A HOST-PRINTED CIRCUIT BOARD AND ELECTRICAL CONNECTOR

(75) Inventor: Karl Schrödinger, Berlin (DE)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/935,637

(22) Filed: Sep. 7, 2004

(51) Int. Cl.
*G02B 6/36* (2006.01)
*G02B 6/42* (2006.01)

(52) U.S. Cl. .......................... 385/92; 385/88
(58) Field of Classification Search ............... None
See application file for complete search history.

(56) References Cited

U.S. PATENT DOCUMENTS

| | | | | |
|---|---|---|---|---|
| 5,599,595 | A * | 2/1997 | McGinley et al. ............. 428/33 |
| 6,201,704 | B1 * | 3/2001 | Poplawski et al. ........... 361/753 |
| 6,222,665 | B1 * | 4/2001 | Neuner et al. ............... 359/245 |
| 6,227,720 | B1 * | 5/2001 | Isaksson ....................... 385/75 |
| 6,840,685 | B1 * | 1/2005 | Kuba ........................... 385/88 |
| 6,840,686 | B2 * | 1/2005 | Jiang et al. .................... 385/92 |
| 6,881,074 | B1 * | 4/2005 | McLenaghan ............... 439/70 |

* cited by examiner

*Primary Examiner*—Sung Pak
(74) *Attorney, Agent, or Firm*—Workman Nydegger

(57) ABSTRACT

The invention provides an optoelectronic arrangement having a pluggable optoelectronic module and an electric plug arranged on a host printed circuit board. The optoelectronic module comprises at least one optoelectronic transducer, at least one electronic chip, and a module printed circuit board with a plurality of first electric contacts. The electric plug is electrically connected to the host printed circuit board and has a plurality of second electric contacts which, when the module is plugged in, are in electric contact with the first electric contacts of the module printed circuit board. Also provided are a displacement mechanism for linearly displacing the module into an end position with reference to the electric plug, and a contact mechanism for making contact and breaking contact between the first electric contacts and second electric contacts. It is possible in this case to activate the contact mechanism only when the module is in the end position. The present invention also relates to a very compact electric plug which is arranged on a host printed circuit board.

28 Claims, 17 Drawing Sheets

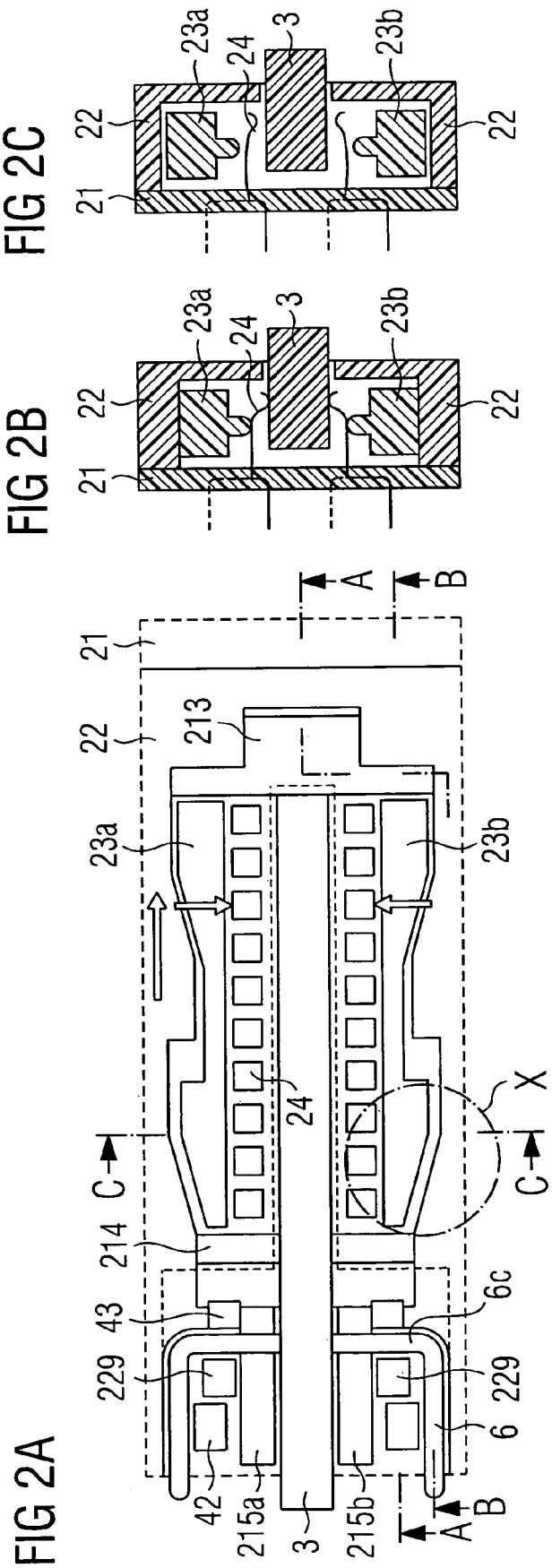

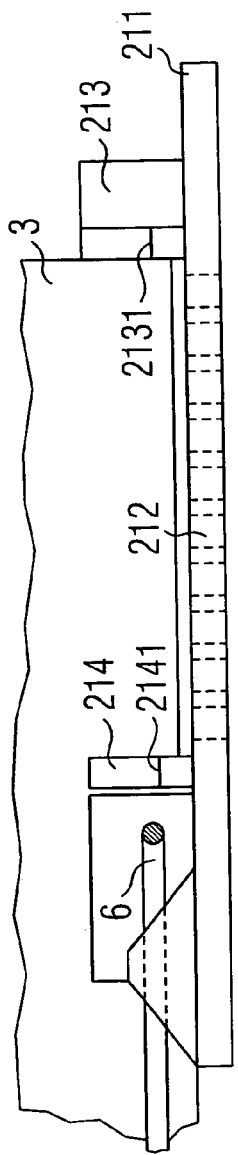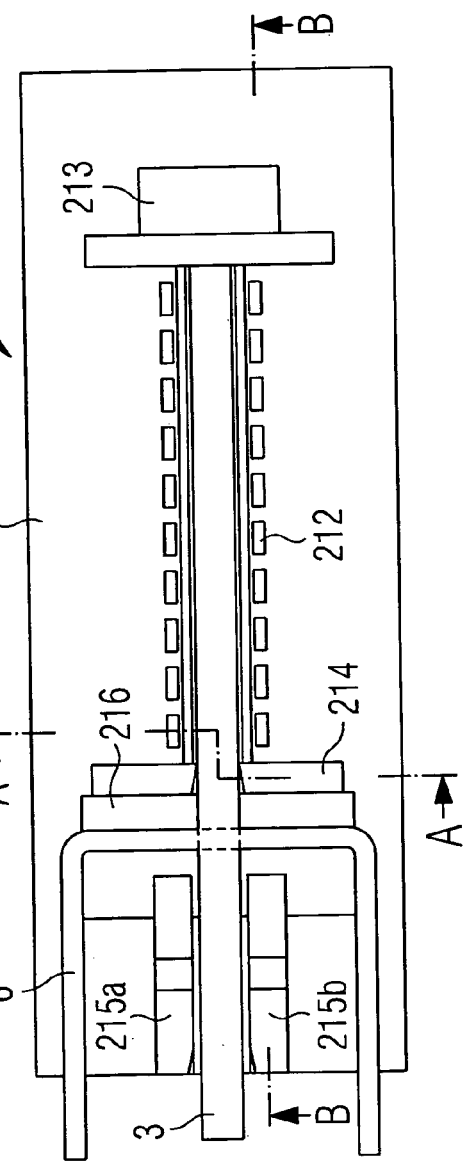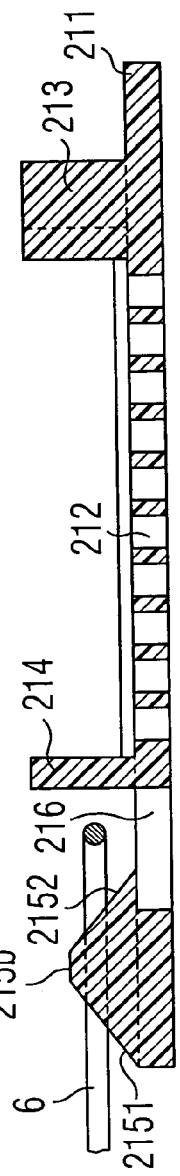
FIG 3A
FIG 3B
FIG 3C
FIG 3D

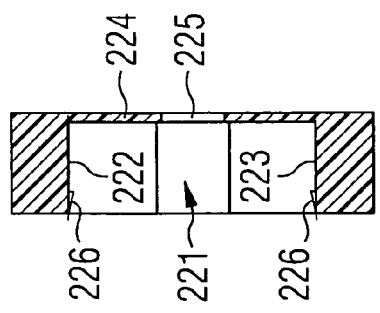
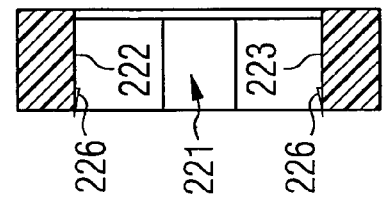
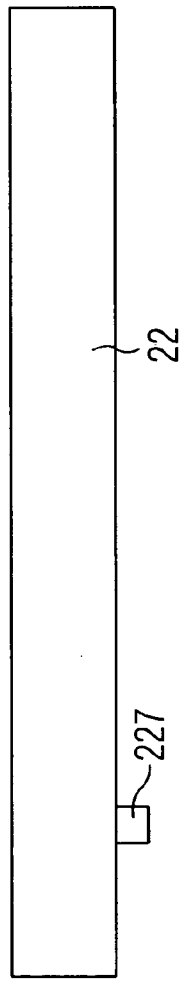
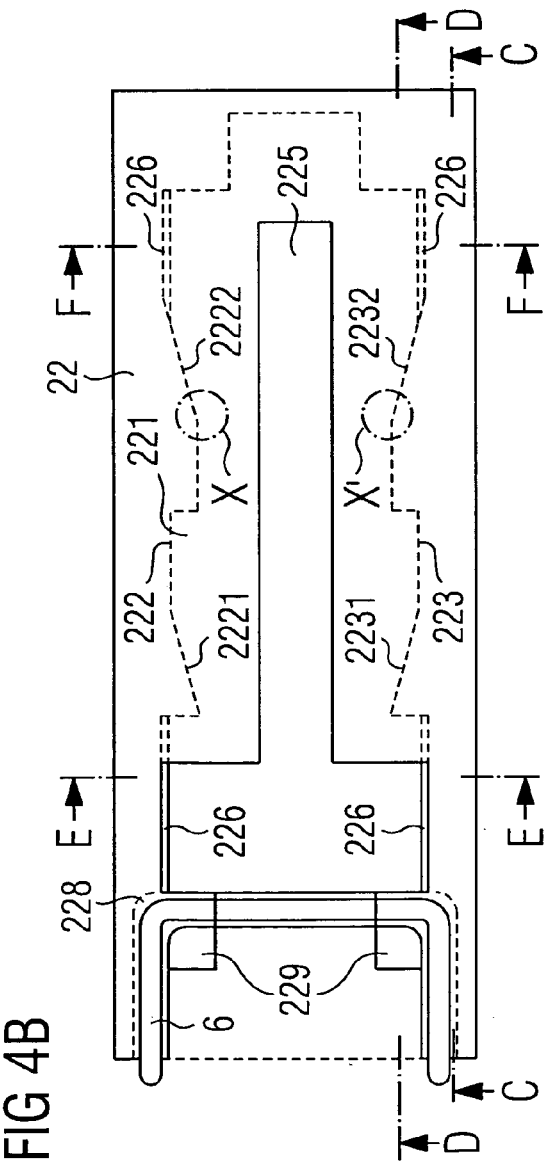

OPTOELECTRONIC ARRANGEMENT WITH A PLUGGABLE OPTOELECTRONIC MODULE AND AN ELECTRICAL CONNECTOR TO BE MOUNTED ON A HOST-PRINTED CIRCUIT BOARD AND ELECTRICAL CONNECTOR

FIELD OF THE INVENTION

The invention relates to an optoelectronic arrangement having a pluggable optoelectronic module and an electric plug arranged on a host printed circuit board, and to a corresponding electric plug. The invention relates in particular to an extremely compact arrangement and an extremely compact electric plug for a reduced small form factor module (SFP/2—small form factor half) having a vertically mounted module printed circuit board.

BACKGROUND OF THE INVENTION

So called small form factor pluggable (SFP) transceivers of small design are known which can be pluggably arranged on a host printed circuit board. For this purpose, the SFP transceivers are plugged into a screening cage which is fastened on the host printed circuit board. In addition to an optoelectronic transmitting module and an optoelectronic receiving module, the known transceivers have an internal module printed circuit board which is arranged in parallel alignment with the host printed circuit board in the transceiver. Integrated circuits such as a driver block and/or a pre-amplifier block are arranged on the internal module printed circuit board. Optical waveguides can be optically coupled to the transducers via an optical port of the SFP transceiver.

It is known for the purpose of electrical connection between the module printed circuit board and the host printed circuit board to use an electric plug which is permanently mounted on the host printed circuit board.

When the transceiver is plugged into the screening cage, electric contacts of the module printed circuit board come into contact with associated contacts of the electric plug, as a result of which the electric and optoelectronic components arranged on the module printed circuit board are electrically connected to the host printed circuit board.

An SFP transceiver is described, for example, in DE 101 14 143 A1.

An attempt is being made to reduce further the size of the known SFP transceivers, in particular to provide reduced pluggable SFP modules of half width (SFP/2 modules). There is thus a need for optoelectronic transceiver arrangements and associated electric plugs which have an extremely compact design and can be implemented with an SFP design or SFP/2 design.

SUMMARY OF THE INVENTION

The invention provides an optoelectronic arrangement having a pluggable optoelectronic module and an electric plug arranged on a host printed circuit board. The optoelectronic module comprises at least one optoelectronic transducer, at least one electronic chip, and a module printed circuit board with a plurality of first electric contacts. The electric plug is electrically connected to the host printed circuit board and has a plurality of second electric contacts which, when the module is plugged in, are in electric contact with the first electric contacts of the module printed circuit board. Also provided is a displacement mechanism for linearly displacing the module into an end position with reference to the electric plug, and a contact mechanism for making contact and breaking contact between the first electric contacts and second electric contacts. It is possible in this case to activate the contact mechanism only when the module is in the end position.

The solution according to the invention is therefore based on the idea of making an activation of the contact mechanism dependent on whether the module is in the end position with reference to the electric plug. Only once the end position is reached is it possible to use the contact mechanism to bring the first electric contacts and the second electric contacts into contact with one another (or separate them again). There are thus two phases following one another to be distinguished when mounting the module. In the first phase, the module is displaced into an end position with reference to the electric plug by means of the displacement mechanism. After the end position has been reached, all that is done in a second phase is to use the contact mechanism to make contact between the first and second electric contacts, the module no longer being displaced in relation to the electric plug during this second phase. The temporal sequence of the two phases is determined by a positive coupling between the displacement mechanism and the contact mechanism to the extent that the displacement mechanism provides an arrangement which is required to activate the contact mechanism.

The solution according to the invention ensures that the electric contacts are not closed unless the module and the module printed circuit board has reached the end position with reference to the electric plug, that is to say is fully plugged in. This prevents the module contacts from being pushed successively over the plug contacts during plugging of the module. Appropriate electric plugs are also designated as zero force plugs or ZIF (ZIF—Zero Insertion Force) plugs, but have been known to date only for packages of integrated electronic circuits.

In a preferred refinement of the invention, the module printed circuit board is perpendicular to the host printed circuit board and therefore aligned vertically in the module. This permits the module to be configured to save space in a particular compact form, and permits a smaller form factor to be implemented. In this case, the printed circuit board can be embodied both as a rigid printed circuit board and as a flexible printed circuit board.

In a preferred refinement, the contact mechanism comprises two parts of the electric plug which can be displaced relative to one another. When these parts execute a relative movement, the second electric contacts of the plug are moved relative to the first electric contacts of the module printed circuit board. A first relative movement (of the two mutually displaceable parts of the plug) causes a second relative movement (of the second electric contacts of the plug) in the case of this refinement. The closure of the electric contacts of an electric plug and module printed circuit board can therefore be implemented in a defined way via the first relative movement.

The electric plug is preferably embodied according to the invention in such a way that it has a baseplate, a cover which can be displaced longitudinally with reference to the baseplate, at least one resilient press-on part, and a plurality of spring contacts as second electric contacts, the at least one resilient press-on part being pressed against the spring contacts or moved away therefrom during movement of the cover relative to the baseplate. It is therefore possible as a function of the relative position between the baseplate and the cover to move the resilient press-on part to and fro between a contact-making position, in which it presses against the spring contacts, and a release position, in which the spring contacts are released.

In an advantageous refinement, the resilient press-on part and the cover in each case form at least one obliquely running surface over which the two parts come into contact or out of contact during a relative movement between the cover and the baseplate. After the obliquely running surfaces come into contact, the resilient press-on part and the cover move relative to one another in a direction which is perpendicular to the direction of the relative movement between the baseplate and the cover. The relative movement between the cover and the baseplate thus produces over oblique surfaces a relative movement between the cover and the resilient press-on part.

A latching mechanism is preferably additionally provided for latching the resilient press-on part and the cover in the contact-making position. This ensures a stable state with contacts closed. In this case, the latching mechanism is provided, for example by latching regions of the respective oblique surfaces of the cover and resilient press-on part.

In a preferred refinement of the electric plug, the cover consists of two subregions designed and arranged symmetrically to one another. Moreover, two resilient press-on parts are provided. The module printed circuit board is inserted into the plug in a vertical arrangement, and there is respectively a subregion of the cover and a resilient press-on part on each side of the vertically arranged module printed circuit board. The electric spring contacts are likewise arranged on both sides of the module printed circuit board in the plug.

It is preferred in this case to provide that the two subregions of the cover are interconnected by a web which runs underneath and perpendicular to the module printed circuit board inserted into the electric plug in a cutout of the baseplate. Such a connecting web prevents the two subregions of the cover being pressed apart from one another by the spring force of the spring contacts. No reliable closure of the contacts would be possible in this case.

In a preferred refinement of the invention, the displacement mechanism comprises an actuating element and a module frame which is permanently connected to the module printed circuit board, and in which the actuating element is functionally coupled to the module frame. Here, the module frame preferably has at least one driver element, at least one springing element resiliently formed in the longitudinal direction of the module, and at least one locking element resiliently formed transverse to the longitudinal direction of the module. The driver element provides a stop for the actuating element during withdrawal of the module from the end position.

The springing element resiliently formed in the longitudinal direction of the module provides a flexible stop for the actuating element when the module is being pushed into the end position. The actuating element in this case presses against the springing element and thereby moves the module frame and the module as a whole into the end position of the module. The springing element thereby ensures that the electric plug does not close before the module has reached the end position.

The locking element resiliently formed transverse to the longitudinal direction of the module has the effect that the module is locked in the end position. It therefore constitutes a locking mechanism for locking in the module with reference to the electric plug (and thus also with reference to the host printed circuit board, on which the electric plug is fastened). The additional locking mechanism ensures that the module can be locked in the end position and cannot inadvertently be pushed out of the end position.

The actuating element is formed, for example, by a wire clip with two wires which run parallel to one another and are joined to one another at their end facing the electric plug, thus forming a cross connection. The cross connection can be formed, for example, in a rectangular, U or semicircular shape. In this case, the module printed circuit board has at its lower side facing the host printed circuit board a cutout through which the cross connection of the wire clip can extend. A wire is understood to be not only a metal or steel wire. It is likewise possible for the wire clip to consist of other materials such as plastic, for example.

It is preferable for the cover to be designed to be able to latch in relation to the baseplate so that simple mounting is possible.

In a further preferred refinement, the baseplate of the electric plug has a first and a second oblique surface which are provided by a triangular elevation of the baseplate running in the longitudinal direction, the triangular elevation being formed on the side of the baseplate facing the actuating element. It is preferred in this case for two such triangular elevations to be present, specifically one on each side of the module printed circuit board arranged vertically in the plug.

It is also provided that the baseplate has a stop element which limits the longitudinal displaceability of the cover in relation to the baseplate, the resilient press-on part being in the release position when the cover strikes against the stop element.

The baseplate also preferably has a fixing element which is spaced apart in the longitudinal direction from the stop element, and in which the resilient press-on element is mounted in the electric plug between the stop element and the fixing element. Mounting is performed in this case in the longitudinal direction of the plug, that is to say the direction in which the module printed circuit board can be pushed in. By contrast, in the transverse direction the resilient press-on element can be displaced between the release position and the contact-making position.

It is preferably provided that the actuating element additionally activates the contact mechanism after the module printed circuit board has reached the end position. The actuating element therefore firstly ensures a displacement of the module into the end position by being coupled to the module frame via the springing element. After the module has reached the end position, a further displacement of the actuating element leads to a closure of the electric contacts. For this purpose, the actuating element preferably engages with the cover after the module has reached the end position. During a further linear movement, the actuating element then displaces the cover in relation to the baseplate, the resilient press-on part being pushed into the contact-making position.

It is also preferably provided for this purpose that the cover forms a transversely running groove in which the cross connection of the wire clip engages in the end position of the module when the actuating element is embodied as a wire clip. In this case, the cross connection of the wire clip is preferably raised at the abovementioned first oblique surface of the baseplate before the end position of the module is reached, and is lowered at the second oblique surface of the baseplate when the end position of the module is reached, the cross connection engaging with the transversely running groove of the cover when being lowered. During withdrawal of the wire clip from the electric plug, by contrast, the cross connection of the wire clip loses engagement with the cover owing to the second oblique surface. In the event of a further withdrawal of the wire clip, the latter then reaches the driver element of the module frame, and the module is thereupon withdrawn from the electric plug.

In this case, in the end position of the module the actuating element can be displaced between a first and a second position, the actuating element being located in the first position after the module has been plugged in and the end position has been reached, and both the locking mechanism and the contact mechanism being activated upon further displacement of the actuating element from the first position into the second position. Thus, after the module has reached the end position with reference to the electric plug the effect of the actuating element is to activate both the contact mechanism and the locking mechanism (module lock/unlock) by virtue of the fact that the actuating element is pushed linearly into the second position in relation to the module carrier.

The circumstances are reversed during withdrawal of the actuating element. Once the actuating element has reached the first position again, it does not engage with the cover (and so the contact is cancelled), and the locking mechanism is unlocked. Upon further withdrawal, the actuating element strikes against the driver element of the module frame, as a result of which the module can be withdrawn.

The spring contacts of the plug are preferably permanently mounted in the baseplate. In this case, the spring contacts are preferably arranged spread open at their lower side facing the host printed circuit board. This permits a relatively narrow arrangement of the contacts on the module printed circuit board to be projected onto a less narrow arrangement for the host printed circuit board soldering.

In a preferred refinement, the resilient press-on element has on the side facing the spring contacts defined elevations which are respectively assigned to a specific spring contact and which effect a closure of the respective spring contact ahead of the other spring contacts when the resilient press-on part is moved into the contact-making position. The module can be hot-plugged owing to the possibility of closing specific contacts such as GROUND, for example, and the supply voltage in advance.

BRIEF DESCRIPTION OF THE DRAWINGS

The invention is explained in more detail below with reference to the figures and with the aid of an exemplary embodiment.

FIG. 2A shows a top view of the electric plug of the arrangement of FIG. 1, the electric plug having a baseplate, a cover, two press-on parts and a plurality of electric spring contacts;

FIG. 2B shows a section through the plug of FIG. 2A along the line C—C, the cover being positioned with reference to the baseplate in such a way that the spring contacts are in contact with the electric contacts of the printed circuit board;

FIG. 2C shows a section through the plug of FIG. 2A along the line C—C, the cover being positioned with reference to the baseplate in such a way that the spring contacts are not in contact with the electric contacts of the printed circuit board;

FIG. 3A shows the baseplate of the electric plug of FIG. 2A together with the printed circuit board, in side view;

FIG. 3B shows a top view of the baseplate of the electric plug of FIG. 3A;

FIG. 3C shows a sectional view of the baseplate of the electric plug of FIG. 3B along the line A—A;

FIG. 3D shows a sectional view of the baseplate of the electric plug of FIG. 3B along the line B—B;

FIG. 4A shows a side view of the cover of the electric plug of FIG. 2A;

FIG. 4B shows a top view of the cover of FIG. 4A;

FIG. 4C shows a sectional view of the cover of FIG. 4B along the line E—E;

FIG. 4D shows a sectional view of the cover of FIG. 4B along the line F—F;

DESCRIPTION OF A PREFERRED EXEMPLARY EMBODIMENT

Figure 1A:
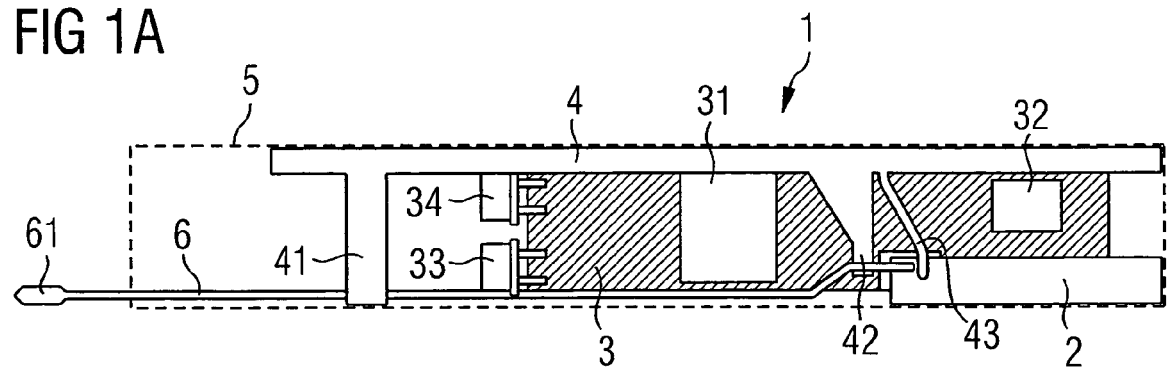
FIG. 1A shows the basic design of an optoelectronic arrangement having a pluggable module and an electric plug arranged on a host printed circuit board (not illustrated), in side view.
Figure 1B:
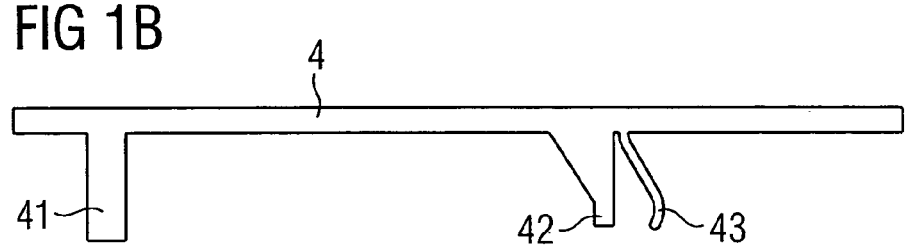
FIG. 1B shows a module frame for the module of FIG. 1A, in side view.

FIG. 1A shows the basic design of an optoelectronic arrangement having a pluggable module 1 and an electric plug 2.

The pluggable module 1 has a module printed circuit board 3 which is arranged permanently in vertical alignment in a module carrier 4 and on which a plurality of electric components 31, 32, 35 (compare also FIGS. 1C to 1D) are arranged. The electric components are, for example, an electric driver block and an electric preamplifier block. An optoelectronic transmitting module 33 and an optoelectronic receiving module 34 are also arranged on one end face of the module printed circuit board. The transmitting and receiving modules 33, 34 are embodied, for example, as mini TO packages and soldered onto the printed circuit board 3 with their electric contact pins extending in the direction of the printed circuit board.

Alternatively, the transmitting module 33 and receiving module 34 can, for example, also be connected to the module printed circuit board 3 by means of a flexible conductor. Other designs of the transmitting module 33 and the receiving module 34 can also be provided. The illustration of FIG. 1 is schematic and exemplary.

The module frame 4 forms two locking elements 41, resiliently formed transverse to the longitudinal direction of the module 1, two driver elements 42 and two springing elements 43 resiliently formed in the longitudinal direction of the module 1. As will be explained in detail later, the locking elements 41 serve to lock the module 1 in the end position, the springing elements 43 serve to displace the module 1 into the end position, and the driver elements 42 serve to remove the module from the electric plug 2. It may be pointed out here that the module printed circuit board 3 is permanently connected to the module frame 4, and a displacement of the frame 4 also displaces the module printed circuit board 3 and the entire module 1.

The entire module 1 can be pushed into a screening cage 5, which is illustrated merely diagrammatically in the figures. What is involved, for example, is a screening cage 5 made from metal which also provides electromagnetic screening of the module 1 in addition to a packaging function. Just like the electric plug 2, the screening cage 5 is also arranged on a host printed circuit board (illustrated by way of example in FIG. 10).

Figure 9:
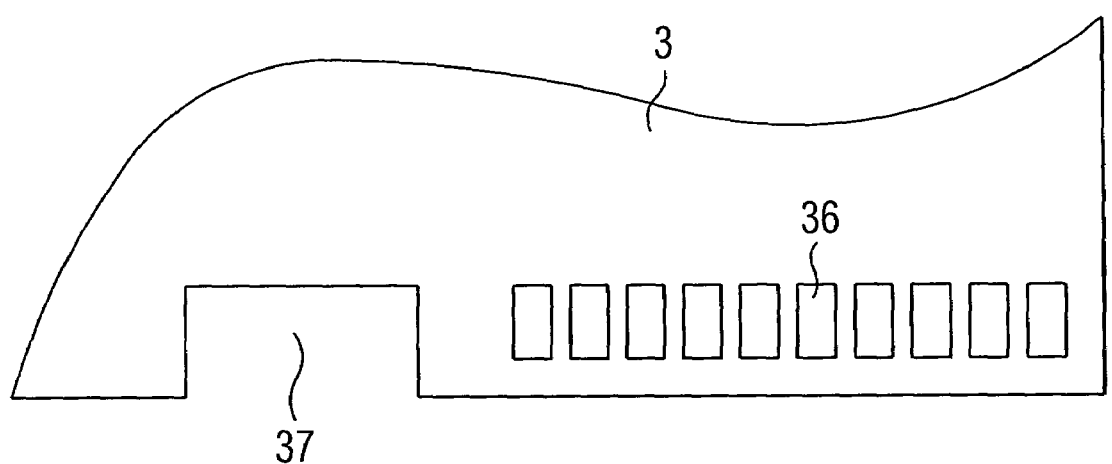
FIG. 9 shows a side view of the module printed circuit board.

The electric printed circuit board 3 has a plurality of electric contacts 36, which are illustrated in FIG. 9. The electric contacts are structured as pads 36, of which there are respectively 10 on each side of the vertically arranged module printed circuit board 3 in the illustrated exemplary embodiment. The electric plug likewise has a plurality of electric contacts. As will be explained in more detail later, the latter are embodied as spring contacts.

When the module 1 is pushed into the screening cage 5 and has reached the end position with reference to the electric plug 2, the (first) electric contacts 36 of the module printed circuit board 3 engage with the assigned (second) electric contacts of the electric plug 2, as a result of which it is possible to make electric contact and transmit signals to/from the components 31, 32, 33, 34, 35 of the module printed circuit board 3 via the host printed circuit board.

Referring to FIGS. 1A to 1G, the displacement mechanism, which permits the module to be pushed in or withdrawn with reference to the screening package 5 and the electric plug 2, will now be examined. Provided for this purpose as actuating element is a wire clip 6 which has on the side averted from the electric plug 2 an actuating surface 61 which permits the user to displace the actuating element 6 in relation to the host printed circuit board. The wire clip 6 consists, for example, of steel or a hard plastic.

In the illustrated refinement, the wire clip 6 has two wires 6a, 6b which run in parallel and extend in the direction of the electric plug 2 in a fashion starting from the actuating surface 61 on the bottom side of the module 1 and adjacent to the lateral bounds of the module 1. The two wires 6a, 6b are interconnected with the formation of a cross connection 6c at the side facing the electric plug 2. A rectangular course of the wire clip 6 overall is provided in this case in the region of the cross connection 6c. However, the cross connection can also be formed for example in the shape of a U.

It is also to be seen that the two wires 6a, 6b have a lesser distance from one another in a region 62 than in the regions adjoining the latter.

Figure 1C:
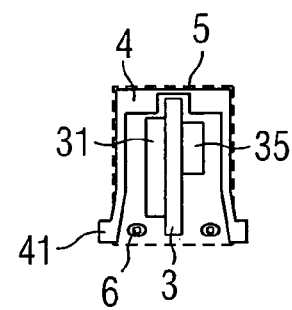
FIG. 1C shows a section through the arrangement of FIG. 1A, with the module in the locked state.
Figure 1D:
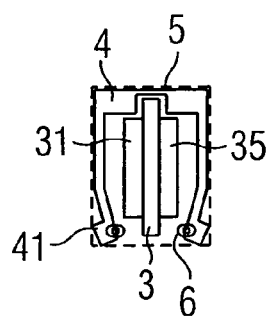
FIG. 1D shows a section through the arrangement of FIG. 1A, with the module in the unlocked state.
Figure 1E:
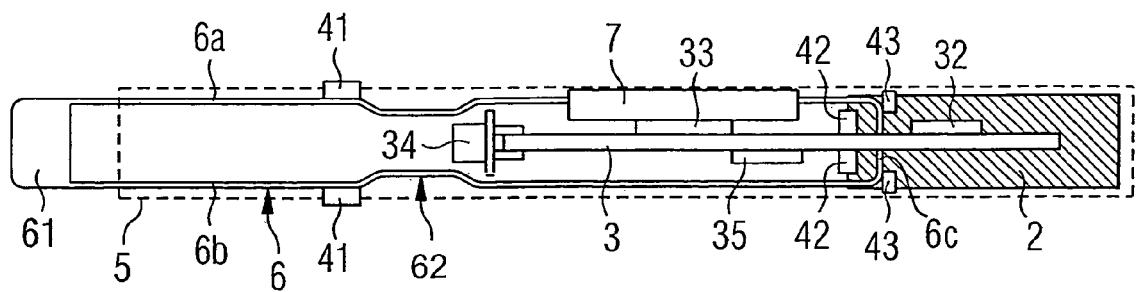
FIG. 1E shows a top view of the arrangement of FIG. 1A.

As may be seen in the sectional illustration of FIG. 1C (which shows a section at the level of the locking springs 41), the two wires 6a, 6b press the locking springs 41 laterally to the outside in the locked position, and so their ends engage in corresponding openings of the screening cage 5, and the module is locked in the screening cage. In the unlocked position illustrated in FIG. 1D, by contrast, the locking springs 41 are in the region 62 of the wire clip 6, and so they are bent inwards because of their inherent spring force and therefore do not engage with the screening cage 5. In this position, the module is unlocked and can be displaced in relation to the screening cage 5, the electric plug 2 and the host printed circuit board.

The locking springs 41 therefore provide the possibility of locking the module 1 in relation to the electric plug 2. Because of the position of the region 62, locking is performed in this case only once the module 1 with the module printed circuit board 3 is in the end position with reference to the electric plug 2.

Figure 1F:
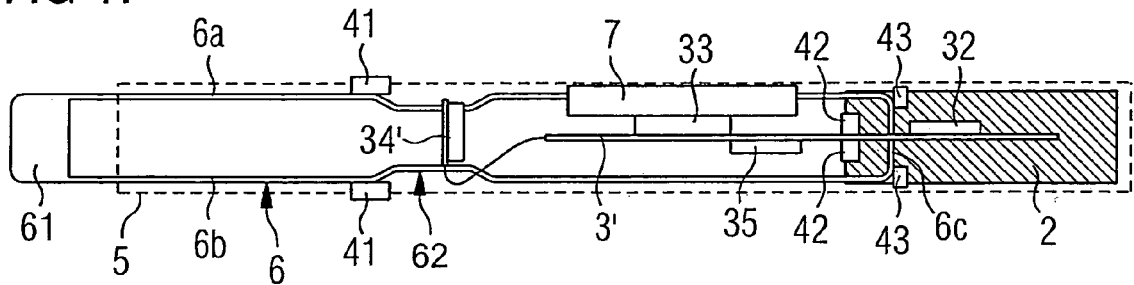
FIG. 1F shows a top view of an optoelectronic arrangement having a modified module, in the case of which the module printed circuit board is embodied as a flexible printed circuit board, the module being in the locked state.
Figure 1G:
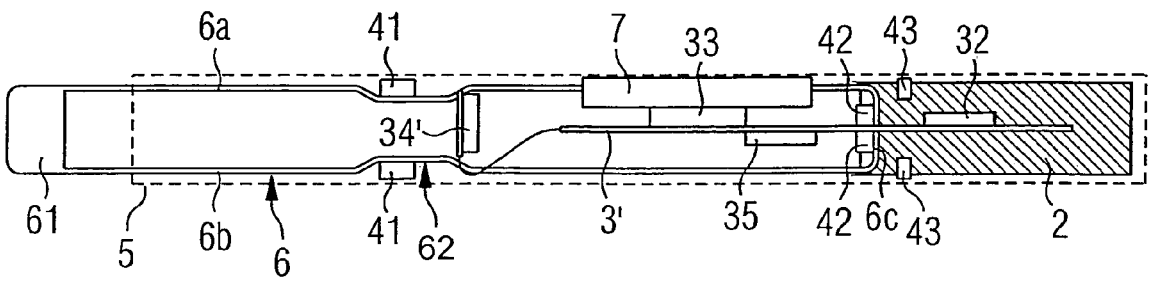
FIG. 1G shows a top view of the arrangement of FIG. 1F, the module being in the unlocked state.

The configuration of FIGS. 1F and 1G differs from the configurations of FIGS. 1A to 1E to the extent that the printed circuit board 3' is configured as a flexible printed circuit board. In a flexible printed circuit board, the conductor tracks are applied on one side, both sides or in several layers on a flexible, insulating substrate. Flexible printed circuit boards have the advantage of favorable RF characteristics at high frequencies in the GHz range. The use of a flexible printed circuit board 3' is also associated with cost advantages, since the entire circuit including the optoelectronic modules 33, 34 and the electronic components 31, 32, 35 need be mounted on only one substrate. The transmitting module and the receiving module 33, 34 can be embodied in this case as an opto-IC which is likewise arranged directly on the printed circuit board. However, even when use is made of a flexible printed circuit board 3' the transmitting component and the receiving component can also be embodied in another design, for example as a mini TO package. The use of a flexible printed circuit board 3' is enabled by the function of a zero force plug such as is provided in the present invention, since no forces which would otherwise deform the flexible printed circuit board become active during insertion of the module and thus of the printed circuit board.

A heat sink 7 likewise illustrated serves the purpose of cooling at least one electric components 33 of the module 1. The heat sink 7 can in this case be pressed directly onto the component to be cooled, for example by means of springs (not illustrated). This is possible in an effective way, in particular, when use is made of flexible printed circuit boards 3'.

The subsequent FIGS. 2 to 8 describe in detail how the module 1 with the module printed circuit board 3 makes contact with the electric plug 2 during insertion of the module, and how it is ensured in this case that the electric contacts 36 of the module printed circuit board 3 and the electric contacts of the electric plug 2 come into contact only once the module 1 is pushed completely into the screening cage 5, and therefore brought into its end position in relation to the electric plug 2 (and the host printed circuit board).

FIG. 2A shows a top view of the electric plug 2 of FIG. 1. As is also well in evidence in the sectional views of FIGS. 2B, 2C, the plug has a baseplate 21, a cover 22, two moveable resilient press-on parts 23, which are designed and arranged as mirror images of one another, and a plurality of electric spring contacts 24. The baseplate 21 is illustrated in detail in FIGS. 3A to 3D, the cover 22 in FIGS. 4A to 4H, and the resilient press-on part 23 in FIG. 5. Before explaining the mode of operation of the overall plug 2, the individual elements of the plug 2 will firstly be explained with reference to FIGS. 3 to 5.

The baseplate 21 comprises a flat bottom part 211 having a multiplicity of cutouts 212 for fastening and guiding through the electric spring contacts 24. A stopper part 213, a fixing element 214 and two triangular elevations 215a, 215b are arranged on the bottom parts 211. The triangular elevations 215 respectively form two oblique surfaces 2151, 2152.

The stopper part 213 serves as a stop, on the one hand for the module printed circuit board 3, which is pushed into the electric plug 2. On the other hand, the stopper part 213 serves as a stop for one end position of the cover 22 with reference to the baseplate 21.

In accordance with FIG. 3C, the spring contacts 24, which project upward into the plug 2 and can come into electric contact with associated contacts 36 (compare FIG. 9) of the module printed circuit board 3, are plugged into the cutouts 212. The spring contacts 24 project from the bottom part 211 on the side facing the host printed circuit board, a spreading open and an offset arrangement being provided in order to project the narrow spacing of the electric contacts 36 on the module printed circuit board 3 onto electric contacts (plated-through holes) of the host printed circuit board with a greater spacing from one another. A number of spring contacts on the underside of the bottom part 211 are designed for this purpose to be bent in accordance with the line represented by dashes.

Together with the stopper part 213, the fixing part 214 serves to fix the resilient press-on parts 23a, 23b in the longitudinal direction, as is also to be gathered from FIG. 2A.

The fixing element 214 and the stopper part 213 respectively form at both transverse ends a horizontally running groove 2141, 2131, which is in latching contact with latching elements (still to be explained) of the cover 22.

Again, the bottom part 211 has a cutout 216 bordering on the fixing element 214 and in the direction of a module 1 to be plugged in.

FIG. 4 shows the displaceable cover 22, which is mounted on the baseplate 21 and connected thereto for this purpose via latching elements. The cover 22 is designed symmetrically and essentially in the shape of a U. Bordering on a middle cutout 221, it forms at two vertically aligned inner edge surfaces 222 and 223 of the cutout 221 a number of surfaces 2221, 2222, 2231, 2232 which run obliquely to the longitudinal direction and come into contact in the event of a longitudinal displacement of the cover 22 in relation to the baseplate 21 with corresponding obliquely running surfaces of the two resilient press-on parts 23a, 23b, compare also FIG. 5.

To protect against dirt and damage to the contacts, the cover 22 is of closed design on its top side 224, that is to say its side averted from the baseplate 21, except for a slot 225 through which the vertically arranged module printed circuit board 3 extends.

Illustrated in FIGS. 4B, 4C and 4D are a number of latching hooks 226 which permit the cover 22 to be latched on the baseplate 21 and for this purpose engage in a latching fashion with the grooves 2241, 2231 of the parts 224, 223 of the baseplate 21, compare also FIG. 3A. In this process, the cover 22 can be displaced in relation to the baseplate 21 during the latching connection, for which purpose the latching hooks 226 respectively extend over a lengthy region.

It may be further pointed out that on the underside of the cover 22 a connecting bar 227 interconnects the two sides of the inherently U-shaped cover part. This is additionally to be seen in the sectional illustrations of FIGS. 4E and 4F. Here, this connection must be made underneath the module printed circuit board 3 plugged into the electric plug 2, for which reason the cutout 216 is provided therefor in the baseplate 21 (compare FIGS. 3B, 3D). Without the connecting bar 227, the spring force of the electric spring contacts 24 would press apart the two limbs or sides of the cover 22 such that reliable closure of the spring contacts 24 would be impossible.

The cover 22 further forms a groove 228 which serves for receiving the cross connections 6c of the actuating element 6 so that the actuating element 6 can undertake a longitudinal displacement of the cover 22 in relation to the baseplate 21. Here, two cuboidal elevations 229 are formed on the top side of the cover 22 in order to form a groove 228.

Figure 5:
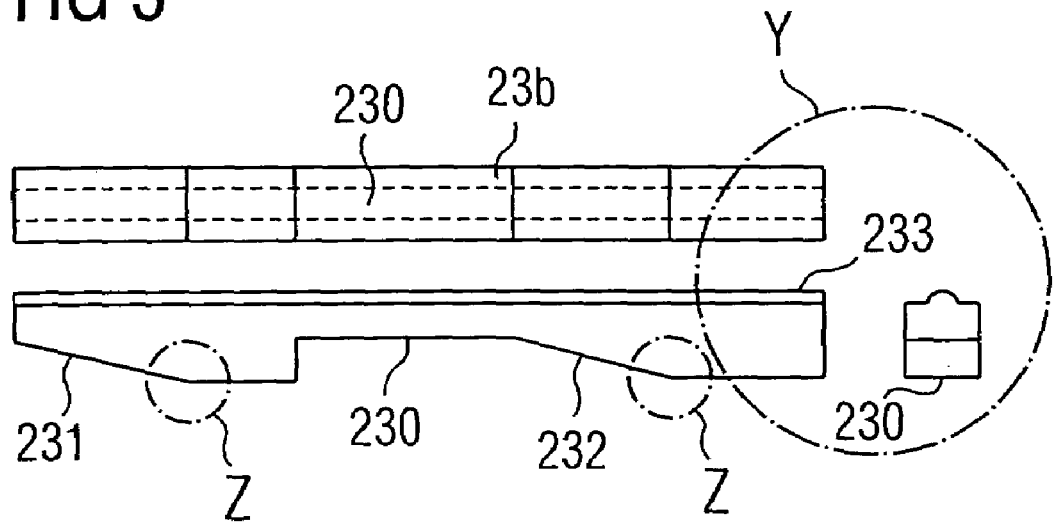
FIG. 5 shows one press-on part of FIG. 2A in a bottom view, side view and sectional view, and a detail Y.
Figure 5:
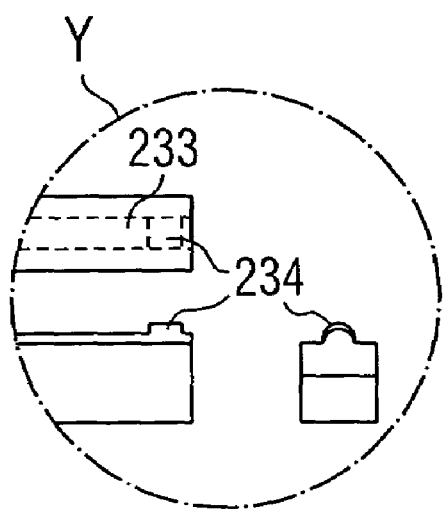
Figure 6B:
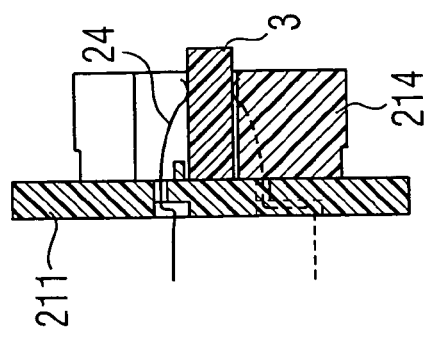
FIG. 6B shows a section through the plug of FIG. 6A along the line A—A.
Figure 6A:
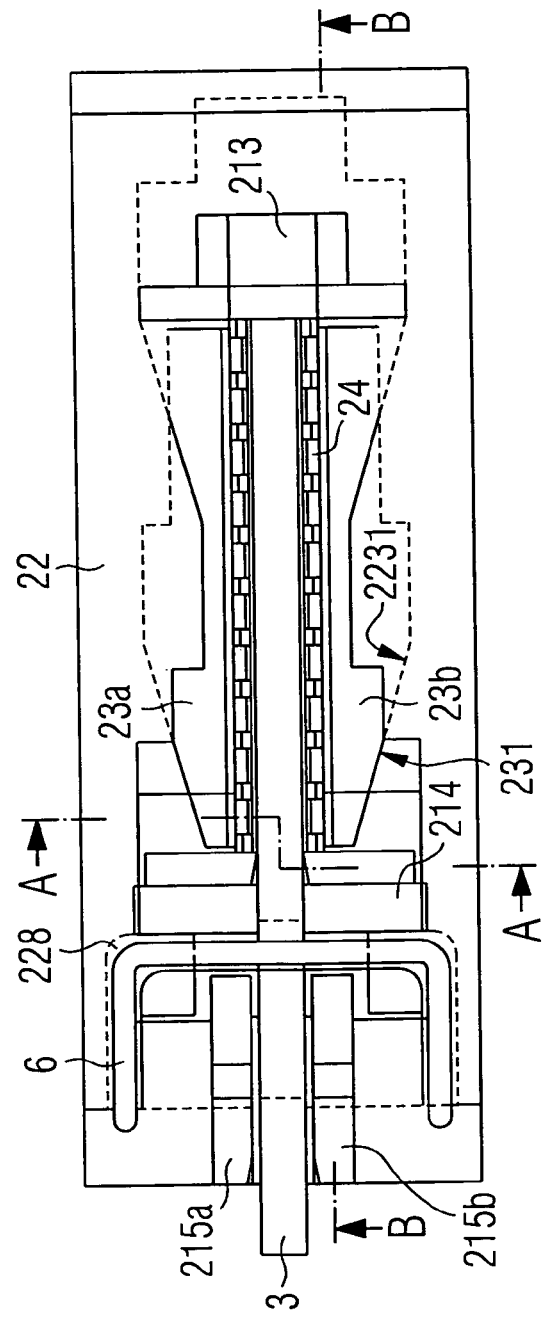
FIG. 6A shows a top view of the electric plug of FIG. 2A, the state with closed spring contacts being illustrated.
Figure 6C:
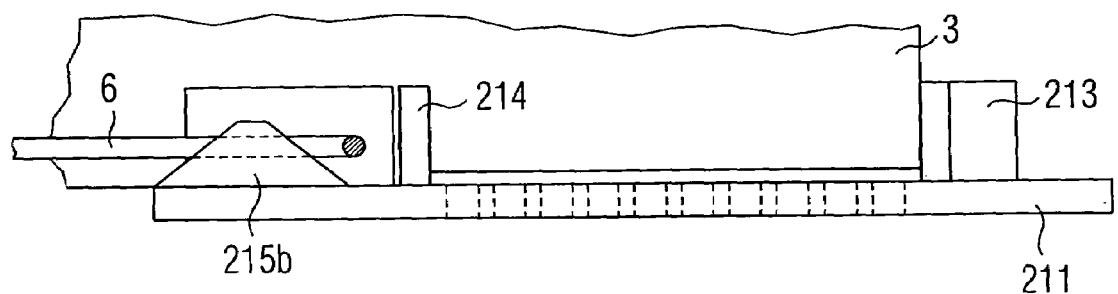
FIG. 6C shows a side view of the plug of FIG. 6A, only the baseplate and the printed circuit board being illustrated.
Figure 6D:
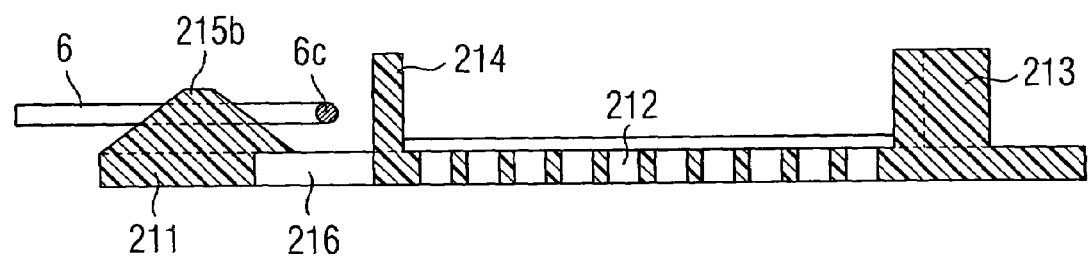
FIG. 6D shows a section through the plug of FIG. 6A along the line B—B, only the baseplate being illustrated.

One 23b of the two resilient press-on parts 23a, 23b is shown in bottom view, side view and sectional view in FIG. 5. The two resilient press-on parts 23a, 23b are designed as mirror images of one another. The press-on part 23b has two oblique surfaces 231, 232 on its side 230 facing the cover 22. To close the electric contacts, the cover 22 is longitudinally displaced in relation to the baseplate 21 and thus also in relation to the press-on parts 23a, 23b, the respective oblique planes 2221, 2222, 2231, 2232, 231, 232 striking one another, and the resilient press-on part 23a, 23b being pressed transverse to the displacement direction, against the respective spring contacts 24 such that the spring contacts 24 are closed (that is to say the spring contacts are pressed against the corresponding electric contacts 36 on the printed circuit board 3).

Figure 4E:
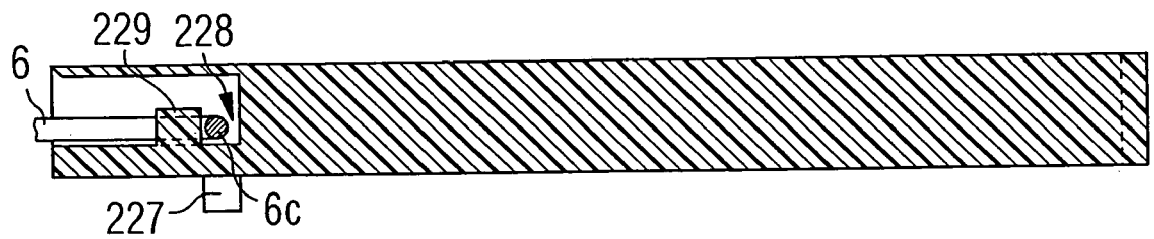
FIG. 4E shows a sectional view of the cover of FIG. 4B along the line C—C.
Figure 4F:
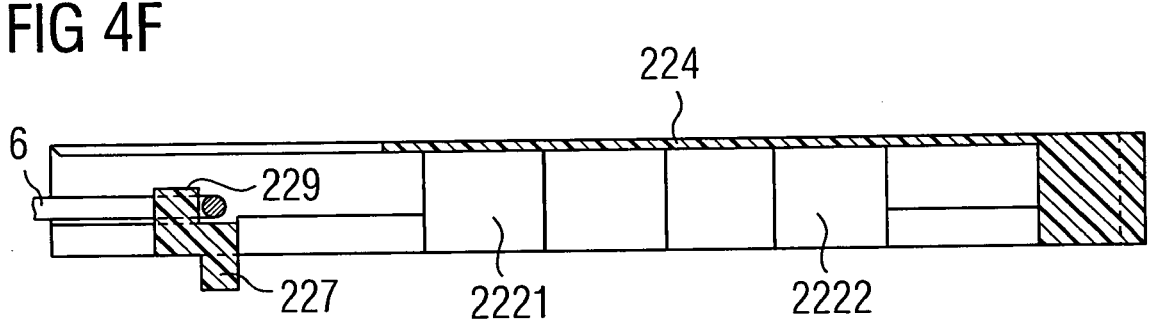
FIG. 4F shows a sectional view of the cover of FIG. 4B along the line D—D.
Figure 4G:
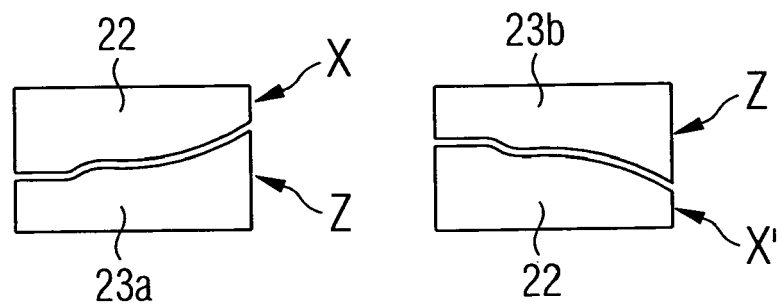
FIG. 4G shows the details X, X' and Z of FIGS. 4B and 5.

In order to achieve a stable state with spring contacts 24 closed, there is a small depression at at least one end of the oblique plane 2222, 2231, 2232, 231, 232 in the case both of the resilient press-on part 23*a*, 23*b* and of the cover 22, and also a projection which corresponds to the said depression and effects latching of the parts 22, 23*a*, 23*b* in the event of closed electric contacts. This is illustrated in FIGS. 2H and 4G.

In accordance with FIG. 5, the resilient press-on part 23*a*, 23*b* has at least one elevation 234 on its side 233 facing the spring contacts 24. The effect of this elevation 234 is that an associated spring contact 24 is prematurely closed during the contact-making operation, since it is more readily pressed against the corresponding contact 36 of the printed circuit board 3. It is possible thereby for a specific contact such as, for example, a ground contact to be closed earlier in a defined way. This permits reliable making and breaking of contacts with the module printed circuit board 3 even with an operating voltage applied, so called hot plugging.

Illustrated in FIG. 9 is a subregion of the printed circuit board 3 which is used in the described arrangement. The printed circuit board 3 has a cutout 37 which serves for leading through the cross connection 6*c* of the wire clip 6. Also illustrated are the plurality of electric contacts 36 against which the individual contact springs 24 of the electric plug 2 are pressed in the state when contact is made.

The mode of operation of the displacement mechanism and of the contact mechanism will now be described with the aid of FIGS. 2, 6, 7 and 8.

The module 1 is plugged into the screening cage 5 by means of the actuating element 6 and is brought in the process into an end position with reference to the electric plug 2. With the module 1 pushed in, the cross connection 6*c* of the actuating element 6 bears against the spring elements 43 of the module carrier 4 such that the module 1 and the printed circuit board 3 are displaced into the end position by means of the actuating element 6. The spring elements 43 ensure in this way that the module 1 must firstly be pushed into the end position before the electric contacts can close. In the end position, the module printed circuit board 3 strikes against the stopper element 213 of the plug 2. In the case of flexible printed circuit boards, a corresponding part of the frame 4 strikes against the stopper element 213.

Furthermore, when the end position is reached, the cross connection 6*c* of the actuating element 6 comes into engagement with the groove 228 of the cover 22. For this purpose, shortly before the module 1 reaches the end position the cross connection 6*c* is raised against its own spring force (compare FIG. 2D) on one oblique surface 2151 (compare FIG. 3D) of the elevation 215*a*, 215*b*. It is lowered again at the other oblique surface 2152 of the elevation 215, and in so doing passes into the groove 228 of the cover 22. The cuboidal elevation 229 secures the cross connection 6*c* in the groove 228.

The plug contacts are not yet closed when the end position is reached, that is to say the electric contact pads 36 of the printed circuit board 3 are not in electric contact with the contact springs 24 of the plug 2. Likewise, the module 1 is not yet locked when the end position is reached.

The actuating element 6 is now displaced further longitudinally in the direction of the plug 2. In this process, on the one hand the module 1 is locked in the screening cage 5, since upon further displacement of the actuating element 6 the locking elements 41 pass out of the region 62 of the actuating element 6 and are therefore bent outward by the wires 6*a*, 6*b* and are latched in corresponding openings of the screening cage (compare FIGS. 1C to 1G).

On the other hand, the electric plug 2 is closed. For this purpose, the actuating element 6, which lies in the groove 228 of the cover 22, displaces the cover 22 in relation to the baseplate 21 (compare FIGS. 2E and 2F). In this case, the loosely inserted resilient press-on parts 23*a*, 23*b* are pressed against the spring contacts 24 owing to the respective oblique surfaces 2221, 222, 2231, 2232, 231, 232 of the cover 22 and resilient press-on part 23*a*, 23*b*, and so the said spring contacts come into contact with the electric contacts 36 of the printed circuit board 3 (only the oblique surfaces 2231, 231 are provided with reference numerals in FIG. 6A). The relative movement of baseplate 21 and cover 22 lasts until the cover and the resilient press-on parts 23*a*, 21*b* latch with one another owing to the latching mechanism of FIGS. 2H, 4G. The resilient press-on parts 23*a*, 23*b* are then in a secured contact-making position.

FIGS. 6A to 6D show the final state with closed contacts. The wire clip 6 and the cover 22 are pushed completely to the right into an end position. Consequently the resilient press-on parts 23*a*, 23*b* acting as interface between the cover 22 and the spring contacts 24 are pressed against the spring contact 24.

Figure 7B:
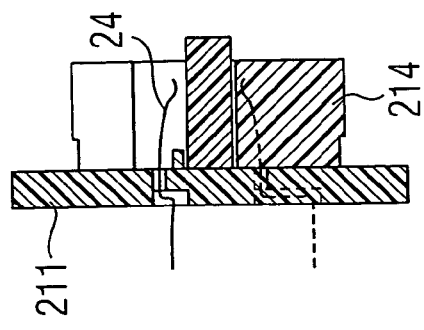
FIG. 7B shows a section through the plug of FIG. 7A along the line A—A.
Figure 7A:
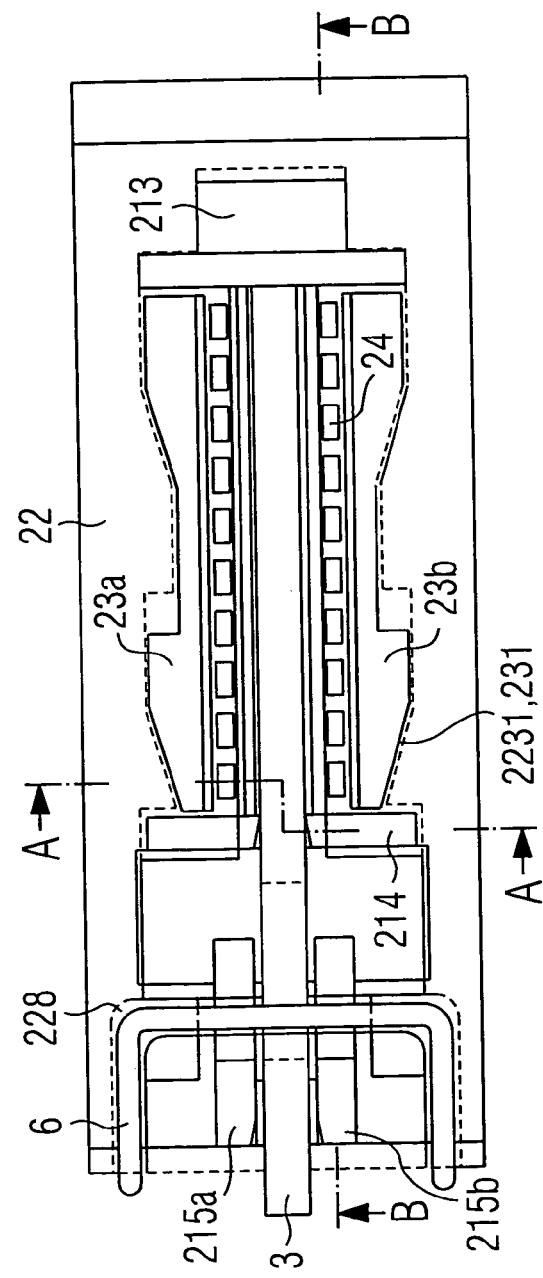
FIG. 7A shows a top view of the electric plug of FIG. 2A, the state with open spring contacts being illustrated, and the module still being in the end position in relation to the electric plug.
Figure 7C:
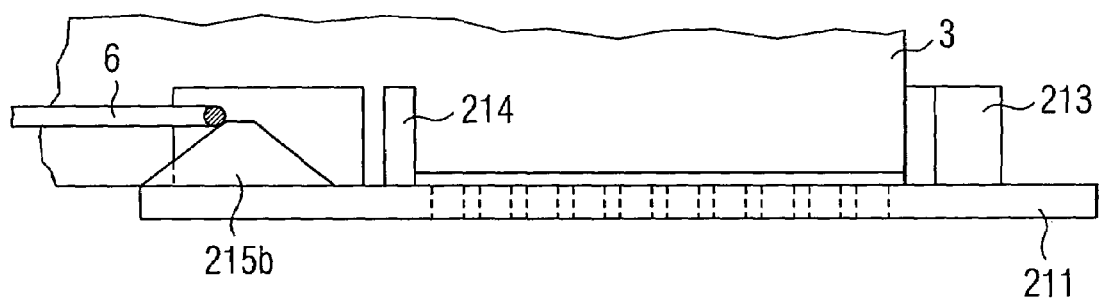
FIG. 7C shows a side view of the plug of FIG. 7A, only the baseplate and the printed circuit board being illustrated.

FIGS. 7A to 7B show the opening operation of the electric contacts. The actuating element 6 is again displaced to the left and has likewise displaced the cover 22 to the left in the process. The respective oblique surfaces of the cover 22 and resilient press-on elements 23*a*, 23*b* are now no longer in engagement. The module locking is also cancelled at the same time. The resilient press-on elements 23*a*, 23*b* are in a release position in which the contacts are open.

Figure 7D:
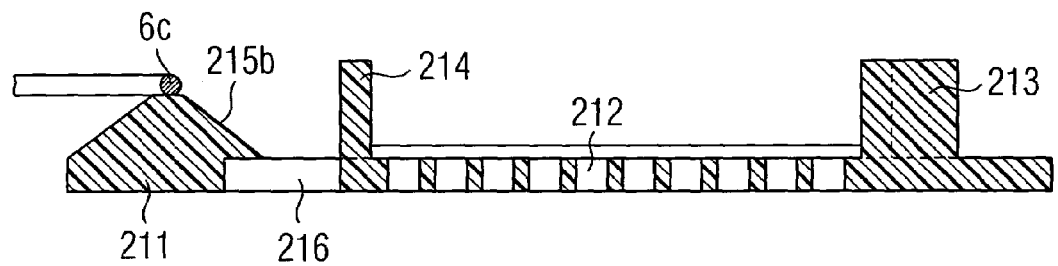
FIG. 7D shows a section through the plug of FIG. 7A along the line B—B, only the baseplate being illustrated.
Figure 8B:
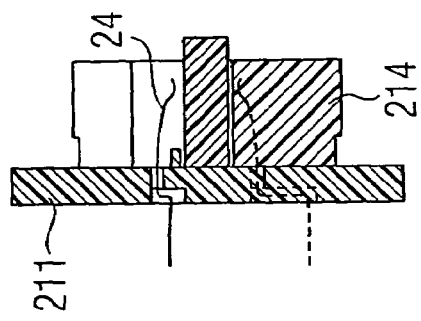
FIG. 8B shows a section through the plug of FIG. 8A along the line A—A.
Figure 8A:
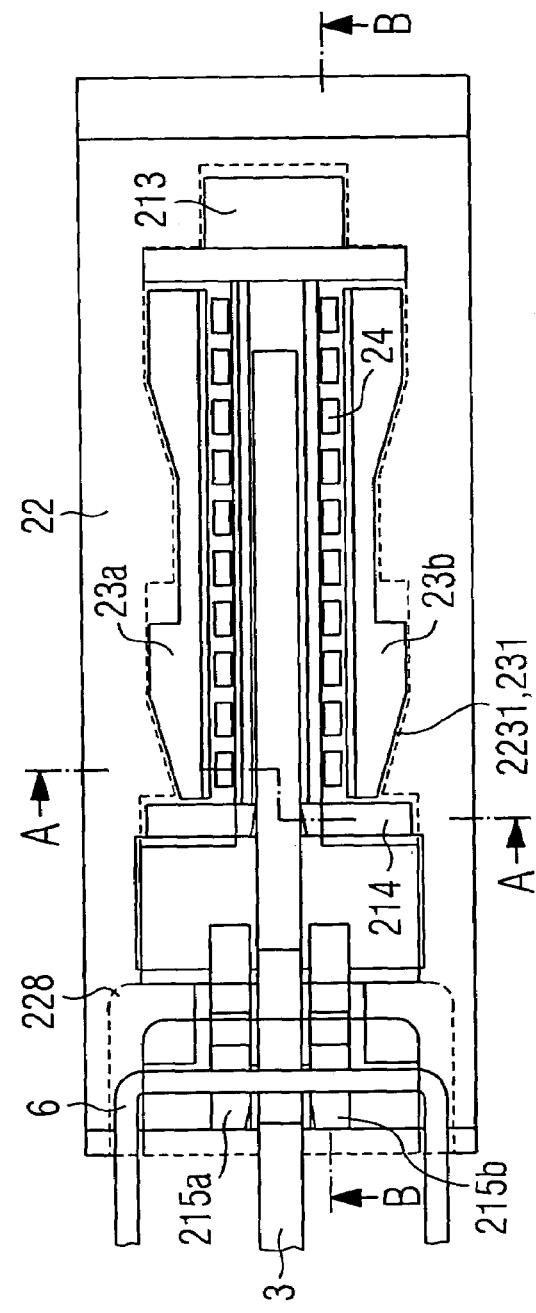
FIG. 8A shows a top view of the electric plug of FIG. 2A, a position being illustrated in which the spring contacts are open and the module and the module printed circuit board are withdrawn from the electric plug.
Figure 8C:
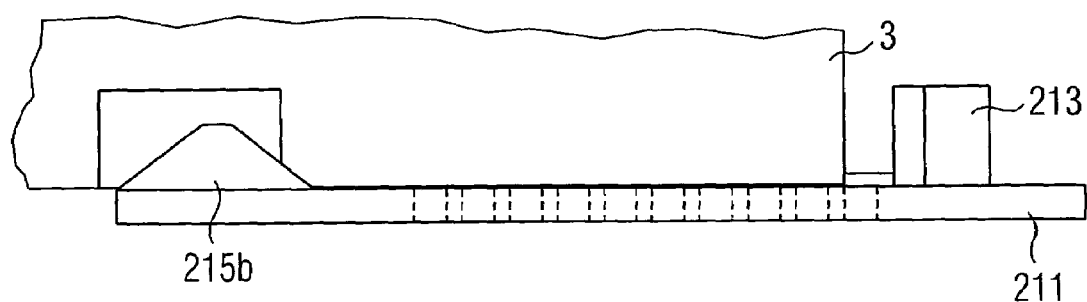
FIG. 8C shows a side view of the plug of FIG. 8A, only the baseplate and the printed circuit board being illustrated.
Figure 8D:
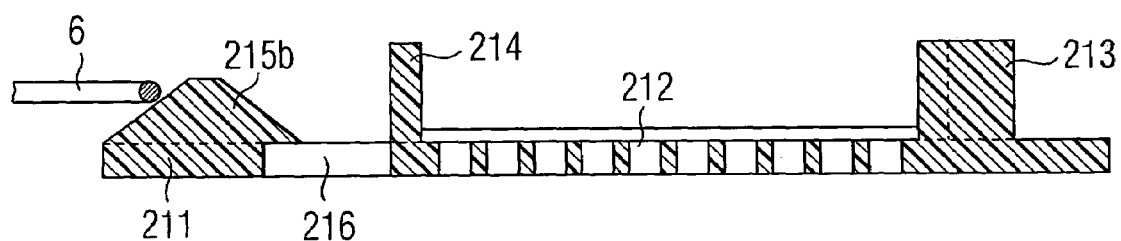
FIG. 8D shows a section through the plug of FIG. 8A along the line B—B, only the baseplate being illustrated.

Furthermore, the cross connection 6*c* of the wire clip 6 is pressed upward by the oblique surface 2152 of the elevation 215*a*, 215*b*, compare FIG. 7D. The clip is therefore no longer in engagement with the groove 228 of the cover, and can be completely withdrawn. The wire clip 6 is pressed lightly resiliently downward for this purpose.

Figure 2D:
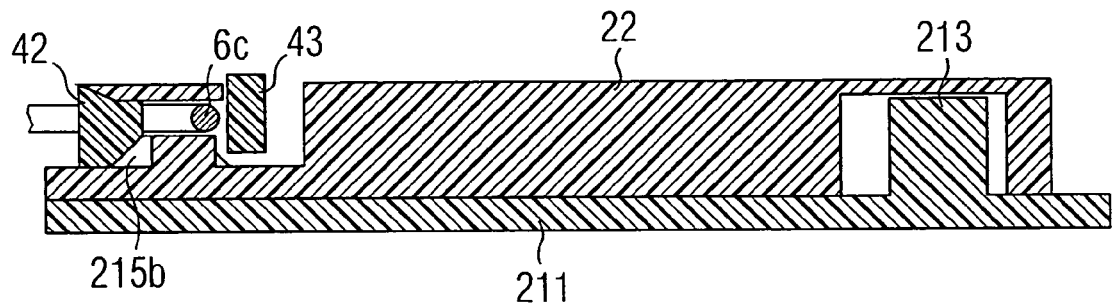
FIG. 2D shows a section through the plug of FIG. 2A along the line A—A, the cover being in a first position in relation to the baseplate.
Figure 2E:
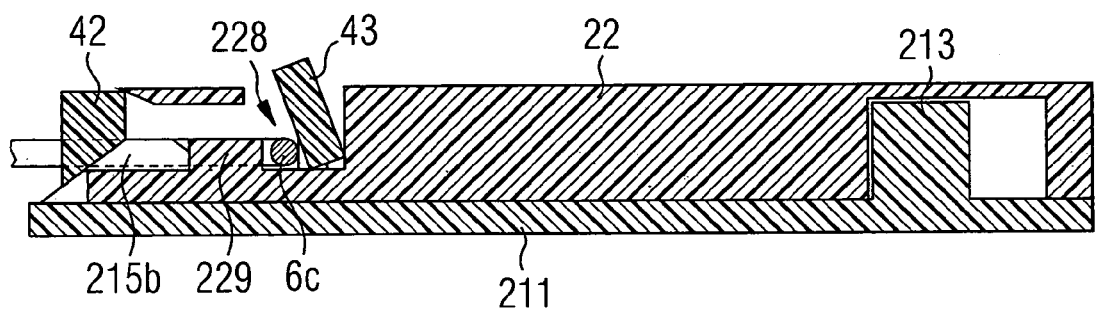
FIG. 2E shows a section through the plug of FIG. 2A along the line A—A, the cover being in a second position in relation to the baseplate.
Figure 2F:
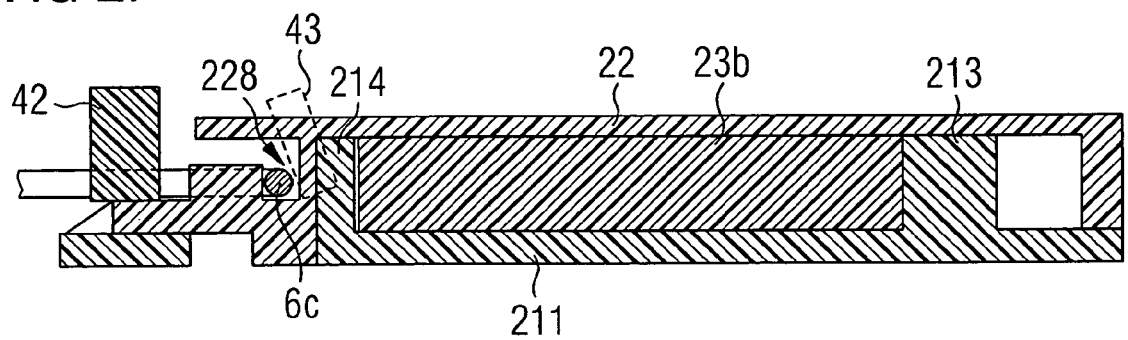
FIG. 2F shows a section through the plug of FIG. 2A along the line B—B, the cover being in the second position in relation to the baseplate.
Figure 2G:
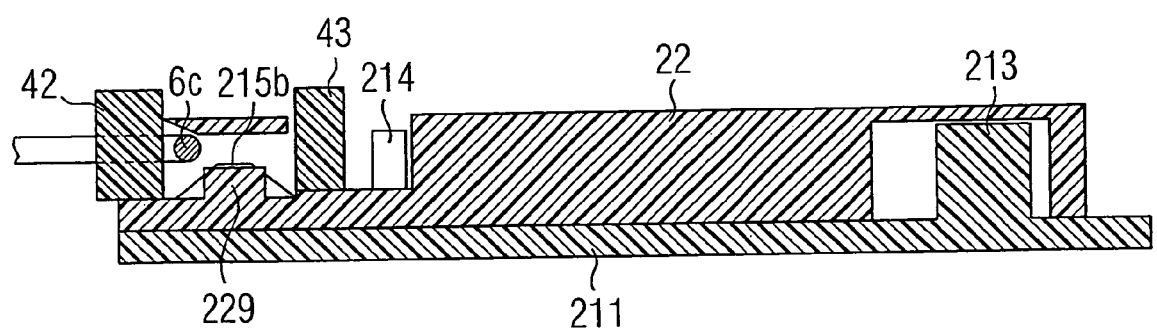
FIG. 2G shows a section through the plug of FIG. 2A along the line A—A, a state being illustrated during withdrawal of the module.
Figure 2H:
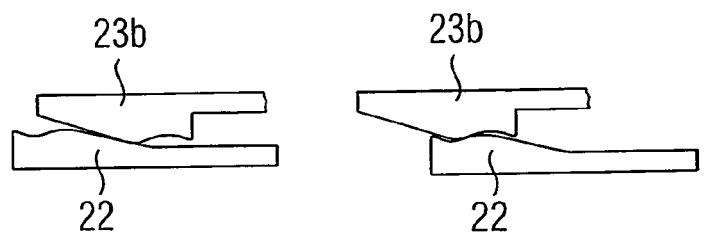
FIG. 2H shows the detail X of FIG. 2A for two different relative positions of the cover and resilient press-on part.

Upon further withdrawal of the actuating element of wire clip 6, the module 1 itself is now moved and withdrawn, the cross connection 6*c* coming to bear against the driver elements 41 of the module frame 4 (compare FIG. 2G). The module 1 is withdrawn from the plug 2 via the driver elements 41. This is shown in FIGS. 8A to 8D. The printed circuit board 3 has already moved away from the stopper element 213. The cover 22 remains in this case in the left-hand stop (provided by the stopper element 213), and the plug 2 is therefore in the open state.

It follows that the module 1 is forcibly removed after contact has been broken with the electric plug 2.

Figure 10:
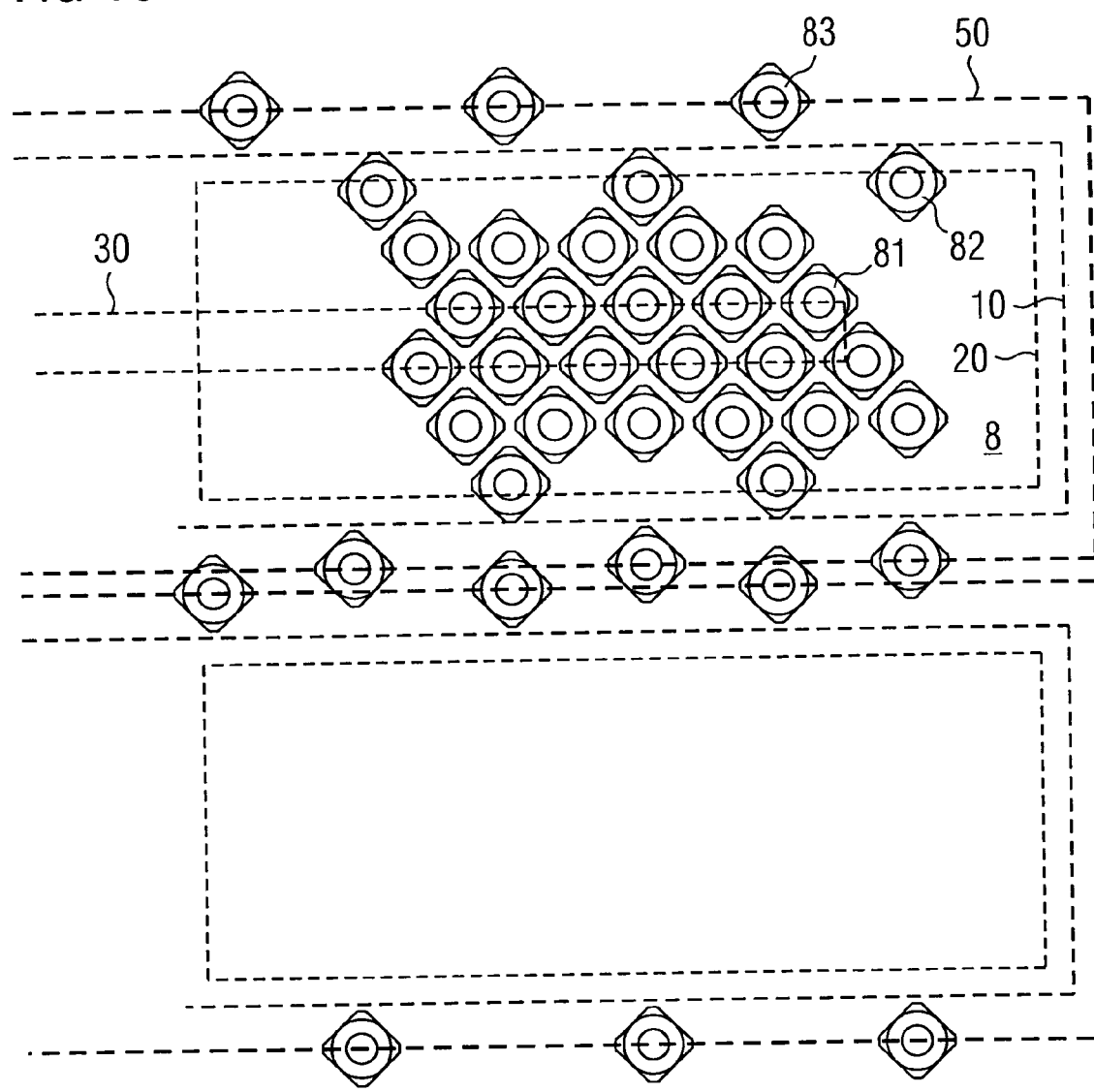
FIG. 10 shows a top view of a host printed circuit board on which the electric plug of the preceding figures can be mounted, the specific board layout for the host printed circuit board being illustrated.

FIG. 10 shows a possible board layout of a host printed circuit board 8 on which the electric plug 2 is mounted. The outlines 50, 10, 20, 30 are represented by dashes respectively for the screening cage 5, the module 1, the electric plug 2 and the module printed circuit board 3. A plurality (twenty) of plated-through holes 81, arranged offset, of the twenty signal pins 24 of the plug 2 are provided on the host printed circuit board 8. It is also possible as an alternative in this case to provide SMD (Surface Mounted Device) pins which are then preferably all arranged in parallel and soldered to the surface of the host printed circuit board 8. For this case, the contact springs 24 of the electric plug form only SMD pins on the rear side of the bottom part 211, or the contact springs are connected to such pins (not illustrated separately).

Furthermore, plated-through holes 82 are provided in the printed circuit board 8 for plug mounting pins and/or adjusting pins which serve for mounting and/or accurately fixing the electric plug 2. Further plated-through holes 83 serve for mounting the screening cage or mounting slot 5.

In the exemplary embodiment illustrated, the pluggable SFP module 1 can be arranged next to one another in an array of 8.125 mm. This corresponds to twice the packaging density by comparison with the previous SFP standard. An arrangement and an electric plug are thus provided for an SFP/2 standard.

The invention is not limited in design to the exemplary embodiments illustrated above. It is evident to the person skilled in the art that numerous alternative variant embodiments exist which employ the teaching defined in the following claims despite their deviation from the exemplary embodiments described.

The invention claimed is:

1. An optoelectronic arrangement comprising:
   a pluggable optoelectronic module having at least one optoelectronic transducer, at least one electronic chip, and a module printed circuit board on which at least the electronic chip is arranged and with which the optoelectronic transducer is associated, the module printed circuit board having a plurality of first electric contacts on a first portion thereof,
   a host printed circuit board;
   an electric plug arranged on the host printed circuit board and connected thereto electrically, the electric plug having a plurality of second electric contacts;
   a displacement mechanism operably connected with the pluggable electronic module such that a predetermined actuation of the displacement mechanism corresponds with achievement of a first state where:
      the first portion of the pluggable electronic module is fully received within the electric plug such that further travel of the pluggable electronic module in the direction of the electric plug is substantially prevented; and
      the plurality of first electric contacts is out of contact with the plurality of second electric contacts; and
   a contact mechanism operably connected with the pluggable electronic module such that a predetermined actuation of the contact mechanism, subsequent to the predetermined actuation of the displacement mechanism, corresponds with a second state where:
      the first portion of the pluggable electronic module remains fully received within the electric plug such that further travel of the pluggable electronic module in the direction of the electric plug is substantially prevented; and
      the plurality of first electric contacts is in electrical communication with the plurality of second electric contacts.

2. The arrangement according to claim 1, wherein the module printed circuit board is arranged perpendicular to the host printed circuit board.

3. The arrangement according to claim 1, wherein the contact mechanism comprises two parts of the electric plug that are configured to be displaced relative to one another, and when these two parts execute a relative movement the second electric contacts of the plug are moved relative to the first electric contacts of the module printed circuit board.

4. The arrangement according to claim 3, wherein the electric plug comprises:
   a baseplate,
   a cover configured to be displaced longitudinally with reference to the baseplate,
   at least one resilient press-on part, and
   a plurality of spring contacts as the second electric contacts,
   wherein the at least one resilient press-on part is pressed against the spring contacts or moved away therefrom during movement of the cover relative to the baseplate, thereby moving the resilient press-on part, as a function of the relative position between the baseplate and the cover to and fro between a contact-making position, in which the press-on part does not substantially press against the spring contacts, thereby permitting the spring contacts to move away from the first contacts.

5. The arrangement according to claim 4, wherein the resilient press-on part and the cover in each case form at least one obliquely running surface over which the two parts come into contact or out of contact during a relative movement between the cover and the baseplate and, after the obliquely running surfaces come into contact, relative the resilient press-on part and the cover move to one another in a direction which is perpendicular to the direction of the relative movement between the baseplate and the cover.

6. The arrangement according to claim 4, further comprising a latching mechanism for latching the resilient press-on part and the cover in the contact-making position.

7. The arrangement according to claim 6, wherein the latching mechanism comprises latching regions of the respective oblique surfaces of the cover and the resilient press-on part.

8. The arrangement according to claim 4, wherein the cover comprises two subregions designed and arranged symmetrically to one another, and wherein the at least one resilient press-on part comprises two resilient press-on parts which are respectively located on opposing sides of the module printed circuit board, wherein the module printed circuit board is arranged perpendicular to the host printed circuit board.

9. The arrangement according to claim 8, wherein the two subregions of the cover are interconnected by a web which runs underneath and perpendicular to the module printed circuit board inserted into the electric plug.

10. The arrangement according to claim 1, wherein the displacement mechanism comprises a module frame permanently connected to the module printed circuit board and an actuating element functionally coupled to the module frame.

11. The arrangement according to claim 10, wherein the actuating element comprises a wire clip with two wires which run parallel to one another and are joined to one another at ends of the two wires that face the electric plug, thus forming a cross connection.

12. The arrangement according to claim 10, wherein the module frame comprises at least one driver element which during provides a stop for the actuating element withdrawal of the module from the end position.

13. The arrangement according to claim 10, wherein the module frame forms at least one spring element which is resiliently formed in a longitudinal direction of the module and which provides a flexible stop for the actuating element during displacement of the module into the end position.

14. The arrangement according to claim 1, further comprising a locking mechanism associated with the electric plug for locking the module in the end position.

15. The arrangement according to claim 14, wherein the module frame comprises at least one locking element, which is resiliently formed transversely to the longitudinal direction of the module and interacts functionally with the actuating element and locks the module in the end position.

16. The arrangement according to claim 4, wherein the baseplate of the electric plug comprises a first and a second oblique surface which are provided by a triangular elevation of the baseplate running in the longitudinal direction, the triangular elevation being formed on the side of the baseplate facing the actuating element.

17. The arrangement according to claim 4, wherein the baseplate comprises a stop element which limits the longitudinal displaceability of the cover in relation to the baseplate, the resilient press-on part being in the release position when the cover strikes against the stop element.

18. The arrangement according to claim 17, wherein the baseplate further comprises a fixing element which is spaced apart in the longitudinal direction from the stop element, and wherein the resilient press-on part is mounted in the electric plug between the stop element and the fixing element.

19. The arrangement according to claim 4, wherein the displacement mechanism further comprises an actuating element and a module frame which is permanently connected to the module printed circuit board, and in which the actuating element is functionally coupled to the module frame, and wherein the actuating element additionally activates the contact mechanism after the module printed circuit board has reached the end position.

20. The arrangement according to claim 19, wherein the actuating element activates the contact mechanism by engaging with the cover after the module has reached the end position, and the actuating element displaces the cover in relation to the baseplate during a further linear movement of the actuating element.

21. The arrangement according to claim 20, wherein the actuating element comprises a wire clip with two wires which run parallel to one another and are joined to one another at ends of the two wires that face the electric plug, thus forming a cross connection, and wherein the cover forms a transversely running groove in which the cross connection of the wire clip engages in the end position of the module.

22. The arrangement according to claim 21, wherein the actuating element comprises a wire clip with two wires which run parallel to one another and are joined to one another at ends of the two wires that face the electric plug, thus forming a cross connection, and wherein the cross connection of the wire clip is raised at one oblique surface of the baseplate before the end position of the module is reached, and is lowered at the other oblique surface of the baseplate when the end position of the module is reached, the cross connection of the wire clip engaging with the transversely running groove of the cover when being lowered.

23. The arrangement according to claim 4, wherein the cover is configured to latch in relation to the baseplate.

24. The arrangement according to claim 11, wherein the module printed circuit board comprises at its lower side facing the host printed circuit board a cutout through which the cross connection of the wire clip extends.

25. The arrangement according to claim 4, wherein the spring contacts are arranged spread open at their side facing the module printed circuit board.

26. The arrangement according to claim 4, wherein on a side facing the spring contacts the resilient press-on part comprises at least one defined elevation which is respectively assigned to a specific spring contact and which effects a closure of the specific spring contact ahead of the other spring contacts when the resilient press-on part is moved into the contact-making position.

27. A pluggable optoelectronic module, comprising:
at least one optoelectronic transducer;
a module printed circuit board having circuitry in electrical communication with the optoelectronic transducer is associated, the module printed circuit board including an electrical connector configured to be removably received by an electric plug of a host printed circuit board;
a displacement mechanism configured such that a predetermined actuation of the displacement mechanism corresponds with achievement of a first state where:
the electrical connector is fully received within the electric plug such that further travel of the pluggable electronic module in the direction of the electric plug is substantially prevented; and
the electrical connector is out of electrical contact with the electrical plug; and
a contact mechanism configured such that a predetermined actuation of the contact mechanism, subsequent to the predetermined actuation of the displacement mechanism, corresponds with a second state where:
the electrical connector remains fully received within the electric plug such that further travel of the pluggable electronic module in the direction of the electric plug is substantially prevented; and
the plurality of first electric contacts is in electrical communication with the plurality of second electric contacts.

28. The pluggable optoelectronic module as recited in claim 27, wherein the second state can be achieved only after the first state is achieved.

* * * * *